United States Patent
Kanazawa et al.

(10) Patent No.: US 10,921,205 B2
(45) Date of Patent: Feb. 16, 2021

(54) PRESSURE SENSOR INCLUDING PROTECTIVE FILM TO AVOID ADHESION OF FOREIGN MATERIAL

(71) Applicant: DENSO CORPORATION, Kariya (JP)

(72) Inventors: Takeru Kanazawa, Kariya (JP); Kazuyuki Ono, Kariya (JP); Shinji Kawano, Kariya (JP)

(73) Assignee: DENSO CORPORATION, Kariya (JP)

( * ) Notice: Subject to any disclaimer, the term of this patent is extended or adjusted under 35 U.S.C. 154(b) by 135 days.

(21) Appl. No.: 16/226,998

(22) Filed: Dec. 20, 2018

(65) Prior Publication Data

US 2019/0120709 A1    Apr. 25, 2019

Related U.S. Application Data

(63) Continuation of application No. PCT/JP2017/025588, filed on Jul. 13, 2017.

(30) Foreign Application Priority Data

Aug. 25, 2016   (JP) .............................. JP2016-164390

(51) Int. Cl.
*G01L 9/00* (2006.01)
*G01L 19/06* (2006.01)

(52) U.S. Cl.
CPC .......... *G01L 9/0048* (2013.01); *G01L 9/0054* (2013.01); *G01L 19/06* (2013.01)

(58) Field of Classification Search
None
See application file for complete search history.

(56) References Cited

U.S. PATENT DOCUMENTS

| | | | | |
|---|---|---|---|---|
| 5,189,914 A | * | 3/1993 | White | G01H 13/00 73/19.03 |
| 5,939,636 A | * | 8/1999 | Glaser | G01L 19/0681 73/706 |
| 2006/0037390 A1 | * | 2/2006 | Nakano | G01F 25/0007 73/204.21 |
| 2006/0137456 A1 | * | 6/2006 | Dasgupta | G01L 9/0073 73/705 |
| 2007/0052046 A1 | * | 3/2007 | Chu | G01L 9/0042 257/415 |

(Continued)

FOREIGN PATENT DOCUMENTS

| CN | 104865002 A | 8/2015 |
|---|---|---|
| CN | 104931163 A | 9/2015 |

(Continued)

*Primary Examiner* — Harshad R Patel
*Assistant Examiner* — Nigel H Plumb
(74) *Attorney, Agent, or Firm* — Posz Law Group, PLC

(57) ABSTRACT

A pressure sensor generates an electrical output according to a fluid pressure in a detection space applied to a diaphragm. The diaphragm is flexibly deformable in a thickness direction. The pressure sensor includes a pressure receiving recess defining the detection space and a protection film covering the pressure receiving recess. The protection film has a corner portion provided in an inner corner area of the pressure receiving recess and a thin film portion having a uniform thickness. The corner portion is located outside the diaphragm in an in-plane direction orthogonal to the thickness direction.

8 Claims, 4 Drawing Sheets

(56) References Cited

U.S. PATENT DOCUMENTS

| | | | | |
|---|---|---|---|---|
| 2007/0275495 A1* | 11/2007 | Mayer | ............... | H01L 23/10 |
| | | | | 438/50 |
| 2011/0278685 A1* | 11/2011 | Yoshikawa | ........... | B81B 3/0078 |
| | | | | 257/417 |
| 2012/0247218 A1* | 10/2012 | Crivelli | ................ | G01L 9/0073 |
| | | | | 73/724 |
| 2013/0200439 A1* | 8/2013 | Doelle | ................ | B81B 3/0021 |
| | | | | 257/254 |
| 2016/0033349 A1 | 2/2016 | Abed | | |
| 2016/0178467 A1 | 6/2016 | Terry et al. | | |
| 2016/0187215 A1* | 6/2016 | Kawano | ................ | G01L 9/0054 |
| | | | | 73/723 |

FOREIGN PATENT DOCUMENTS

| | | |
|---|---|---|
| JP | 2008-261750 A | 10/2008 |
| JP | 2015-197367 A | 11/2015 |
| JP | 2015-22735 A | 12/2015 |
| JP | 2016-142674 A | 8/2016 |

* cited by examiner

PRESSURE SENSOR INCLUDING PROTECTIVE FILM TO AVOID ADHESION OF FOREIGN MATERIAL

CROSS REFERENCE TO RELATED APPLICATION

The present application is a continuation application of International Patent Application No. PCT/JP2017/025588 filed on Jul. 13, 2017, which designated the U.S. and claims the benefit of priority from Japanese Patent Application No. 2016-164390 filed on Aug. 25, 2016. The entire disclosures of all of the above applications are incorporated herein by reference.

TECHNICAL FIELD

The present disclosure relates to a pressure sensor.

BACKGROUND

A pressure sensor has a diaphragm as a detection portion. When deposits such as foreign substances adhere to a surface of a recess for forming the diaphragm, pressure detection accuracy may decrease. Hence, a protection film is provided on the surface of the recess.

SUMMARY

The present disclosure provides a pressure sensor configured to generate an electrical output according to a fluid pressure in a detection space applied to a diaphragm. The diaphragm is flexibly deformable in a thickness direction. The pressure sensor includes a pressure receiving recess defining the detection space and a protection film covering the pressure receiving recess. The protection film has a corner portion provided in a corner area of the pressure receiving recess. The corner portion is located outside the diaphragm in an in-plane direction orthogonal to the thickness direction.

BRIEF DESCRIPTION OF THE DRAWINGS

The above and other objects, features and advantages of the present disclosure will become more apparent from the following detailed description made with reference to the accompanying drawings in which.

DETAILED DESCRIPTION

Figure 1:
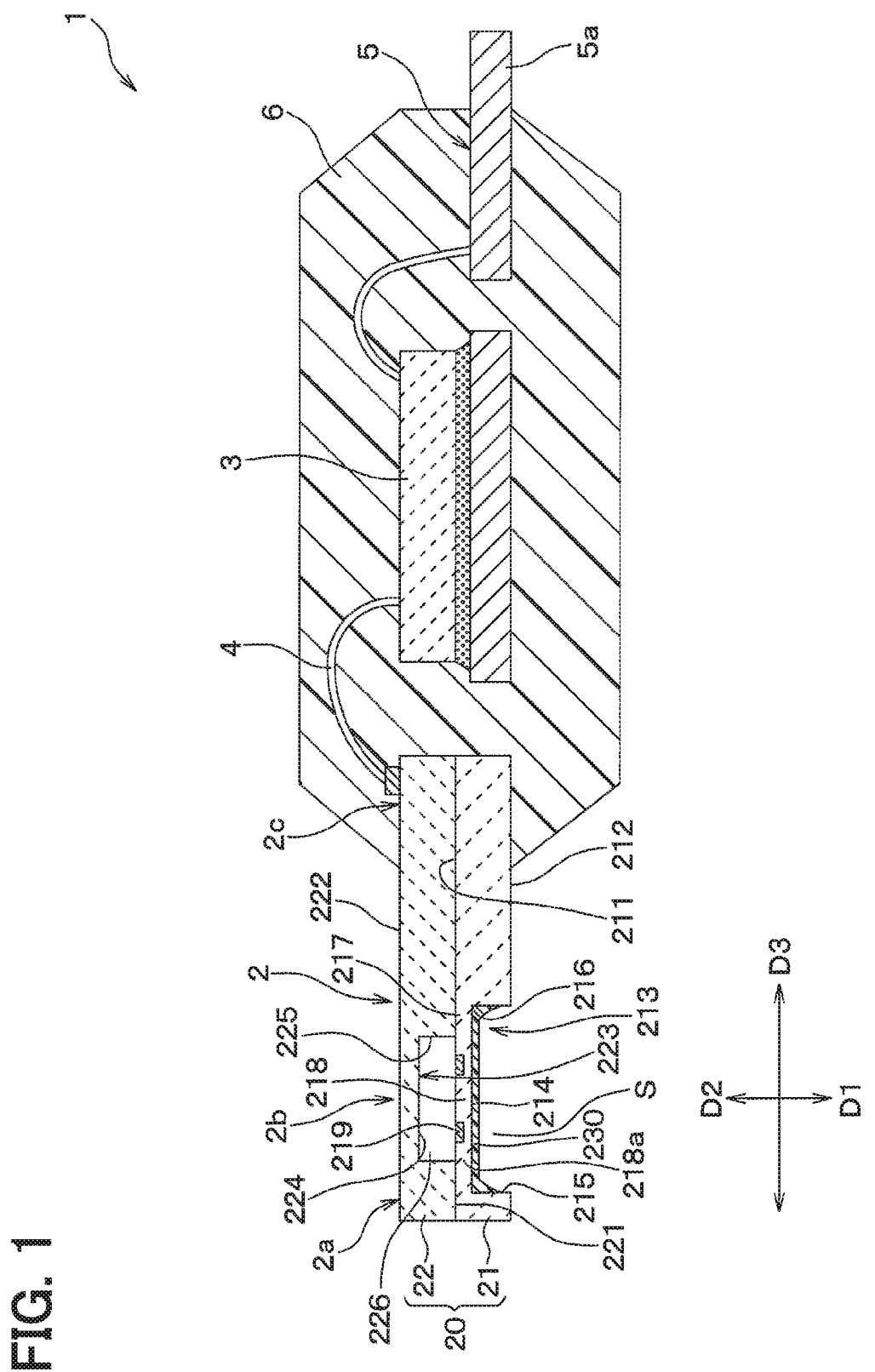
FIG. 1 is a side cross-sectional view showing a schematic configuration of a pressure sensor according to an embodiment.

Hereinafter, an embodiment will be described with reference to the drawings. In addition, in the following embodiment and modifications, the same reference numerals are given to the same or equivalent parts.

(Configuration)

As shown in FIG. 1, a pressure sensor 1 of the present embodiment is an engine oil pressure sensor attachable to a hydraulic oil circulation path in an engine, which is not shown. Specifically, the pressure sensor 1 includes a sensor chip 2. On a side of a distal end portion 2a of the sensor chip 2, a detection portion 2b is formed. The detection portion 2b is configured to generate an electrical output (e.g., voltage) according to the hydraulic oil pressure in a state being dipped in the hydraulic oil when the pressure sensor 1 is equipped to the above-described hydraulic oil circulation path.

A proximal end portion 2c of the sensor chip 2 and a circuit chip 3 are electrically connected via a bonding wire 4. The circuit chip 3 is an IC chip for processing the electrical output generated by the detection portion 2b. The circuit chip 3 is fixed to a lead frame 5 and is electrically connected to the lead frame 5. The proximal end portion 2c of the sensor chip 2, the circuit chip 3, the bonding wire 4, and portions of the lead frame 5 other than a proximal end portion 5a of the lead frame 5 are covered by a mold resin 6. That is, the proximal end portion 5a of the lead frame 5 is exposed out of the mold resin 6.

The sensor chip 2 includes a plate-shaped substrate 20 formed of a semiconductor such as silicon. In FIG. 1, the pressure sensor 1 is shown such that a thickness direction of the substrate 20 is in a vertical direction in the drawing. Hereinafter, the thickness direction of the substrate 20 may be referred to as a "substrate thickness direction". Also, one direction parallel to the substrate thickness direction (i.e., a downward direction in FIG. 1) is referred to as a "detection direction" and is indicated by an arrow D1 in the drawing. A direction opposite to the detection direction is referred to as a "pressure receiving direction" and is indicated by an arrow D2 in the drawing. An arbitrary direction orthogonal to the substrate thickness direction (i.e., a horizontal direction in FIG. 1) is referred to as an "in-plane direction" and is indicated by an arrow D3 in the drawing. Further, viewing the object in a sightline along the detection direction is referred to as a "plan view" and a cross-sectional view taken along a plane parallel to the substrate thickness direction is referred to as a "side cross-sectional view".

Figure 2:
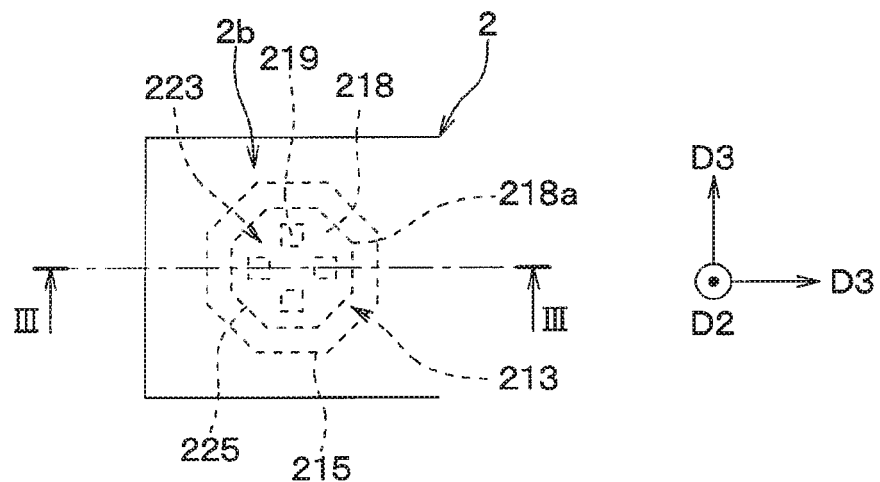
FIG. 2 is a plan view of a detection portion shown in FIG. 1.
Figure 3:
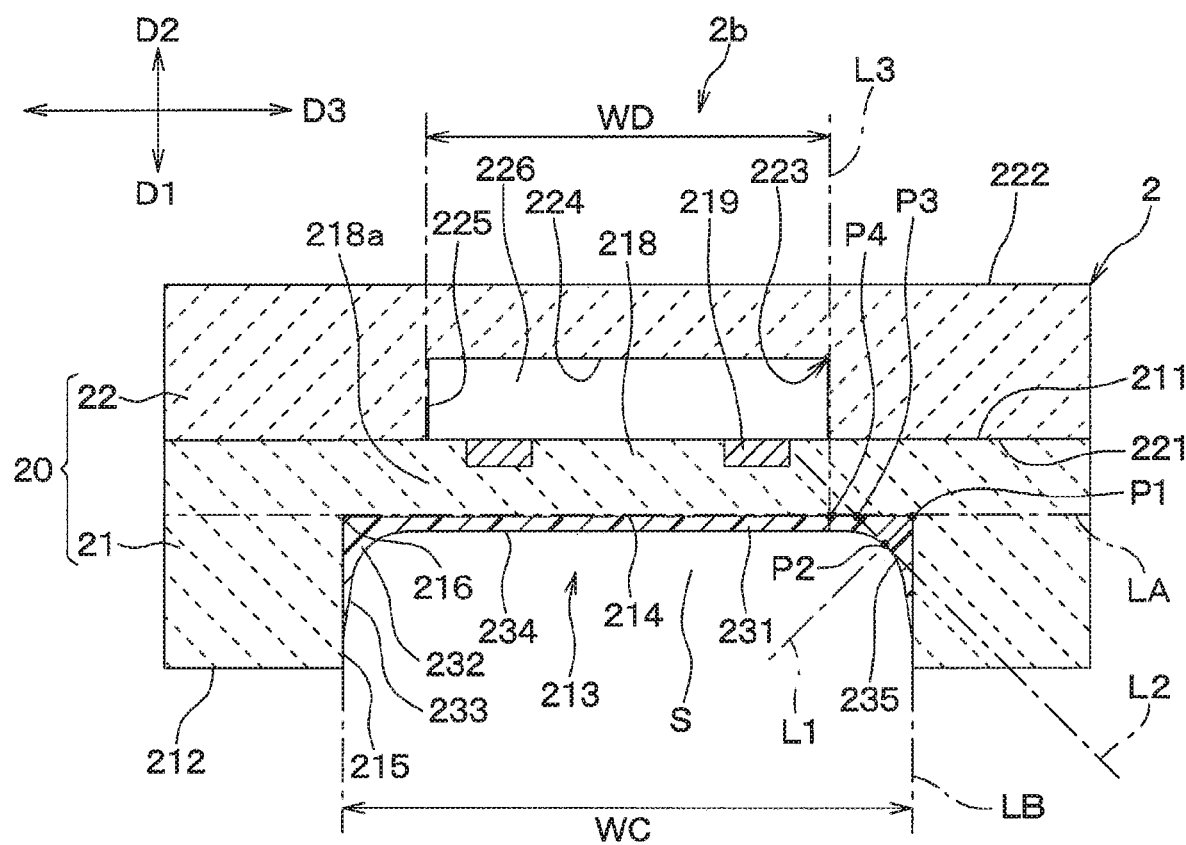
FIG. 3 is a cross-sectional view taken along a line III-III in FIG. 2.

Detailed configurations of the sensor chip 2 and the detection portion 2b will be described with reference to FIGS. 1 to 3. In the present embodiment, the substrate 20 is formed by laminating and joining a first substrate 21 and a second substrate 22 in the substrate thickness direction. That is, the first substrate 21 is bonded to the second substrate 22 at an inner main surface 211, which is one of a pair of main surfaces. The "pair of main surfaces" corresponds to a pair of surfaces having the largest area among three pairs of outer surfaces of the flat plate-like first substrate 21 having a substantially rectangular shape in the plan view. That is, the inner main surface 211 is a plane having a normal direction as the thickness direction of the first substrate 21 (that is, the substrate thickness direction). The first substrate 21 is located on the detection direction side with respect to the second substrate 22.

An outer main surface 212 which is the other of the pair of main surfaces of the first substrate 21 is a surface exposed toward the detection direction and is parallel to the inner main surface 211. A pressure receiving recess 213 is formed in the first substrate 21 adjacent to the outer main surface 212. The pressure receiving recess 213 defines a detection space S by opening toward the detection direction. The detection space S is configured to introduce hydraulic oil therein when the pressure sensor 1 is equipped to the hydraulic oil circulation path.

The pressure receiving recess 213 has a bottom wall 214 and a side wall 215. The bottom wall 214 is a plane parallel to the in-plane direction. In the present embodiment, the bottom wall 214 is formed in a regular octagonal shape in plan view. The side wall 215 protrudes from the outer edge portion of the bottom wall 214 toward the detection direction. Specifically, in the present embodiment, the side wall 215 is formed in an octagonal cylindrical surface shape orthogonal to the regular octagonal bottom wall 214. An inner corner area 216 in the pressure receiving recess 213 is a portion where the planar bottom wall 214 and the planar side wall 215 are vertically connected while facing each other. The inner corner area 216 is formed as a corner forming a right angle in a side cross-sectional view.

A thin portion 217 is formed in the first substrate 21 away from the pressure receiving recess 213 in the pressure receiving direction. The thin portion 217 is a thin-walled portion provided in a part of the first substrate 21 in the thickness direction. Specifically, the thin portion 217 is provided by forming a non-through hole corresponding to the pressure receiving recess 213 from the outer main surface 212 in the first substrate 21. The outer edge portion of the thin portion 217 is provided by the inner corner area 216 in the pressure receiving recess 213.

The diaphragm 218 is provided in a part of the substrate 20 in the substrate thickness direction and the in-plane direction. Specifically, the diaphragm 218 is formed by a portion slightly inside the outer edge portion of the thin portion 217. That is, the inner corner area 216 in the pressure receiving recess 213 provides the outer edge portion of the thin portion 217. The inner corner area 216 is located outside the outer edge 218a of the diaphragm 218 in the in-plane direction. The diaphragm 218 is a thin plate flexibly deformable in its thickness direction (that is, the substrate thickness direction).

The diaphragm 218 is provided with a plurality of gauge portions 219. Each of the gauge portions 219 is a diffusion resistance portion formed by ion implantation from the inner main surface 211 with respect to the first substrate 21 and is configured to change a resistance value in accordance with bending deformation state of the diaphragm 218. In the present embodiment, the gauge portions 219 are located near the outer edge 218a of the diaphragm 218. Further, in the present embodiment, four gauge portions 219 are provided and electrically connected to each other so as to form a Wheatstone bridge. As described above, the pressure sensor 1 is configured to generate an electrical output corresponding to the hydraulic oil pressure in the detection space S applied to the diaphragm 218. The detection space S and the diaphragm 218 are adjacent to each other in the substrate thickness direction.

The second substrate 22 is bonded to the first substrate 21 at an inner main surface 221, which is one of a pair of main surfaces. An outer main surface 222 which is the other of the pair of main surfaces of the second substrate 22 is parallel with the inner main surface 221.

The second substrate 22 has a rear recess 223 adjacent to the inner main surface 221. The rear recess 223 is a recess formed in the second substrate 22 and opening toward the detection direction. The rear recess 223 is provided by forming a non-through hole from the inner main surface 221 toward the outer main surface 222. A top wall 224 of the rear recess 223 has a regular octagonal shape smaller than the bottom wall 214 of the pressure receiving recess 213 in the first substrate 21 in plan view. That is, the top wall 224 of the rear recess 223 is provided concentrically with the bottom wall 214 of the pressure receiving recess 213 in the first substrate 21 in a plan view.

A side wall 225 of the rear recess 223 protrudes from an outer edge portion of a top wall 224 toward the detection direction. Specifically, in the present embodiment, the side wall 225 has an octagonal cylindrical surface shape orthogonal to the regular octagonal top wall 224. The side wall 225 of the rear recess 223 is provided inside the side wall 215 of the pressure receiving recess 213 in the in-plane direction in plan view.

By joining the first substrate 21 and the second substrate 22, the rear recess 223 is closed by the thin portion 217 in the first substrate 21. That is, the rear recess 223 provides a hollow 226 located away from the diaphragm 218 toward the pressure receiving direction. The hollow 226 faces the detection space S and the diaphragm 218 is interposed between the hollow 226 and the detection space S.

As described above, the substrate 20 of the sensor chip 2 includes the first substrate 21 and the second substrate 22 joined with each other. The first substrate 21 has the pressure receiving recess 213 and the diaphragm 218. The second substrate 22 has the rear recess 223 providing the hollow 226 by opening toward the detection direction. The detection portion 2b includes the diaphragm 218, the pressure receiving recess 213 and the hollow 226. The diaphragm 218 includes the plurality of gauge portions 219. The pressure receiving recess 213 and the hollow 226 are located on both sides of the diaphragm 218 in the substrate thickness direction.

The diaphragm 218 is provided by a part of the thin portion 217 corresponding to the hollow 226. As described above, the hollow 226 is smaller than the thin portion 217 in plan view. That is, the inner corner area 216 providing the outer edge portion of the bottom wall 214 of the pressure receiving recess 213 is located outside the hollow 226 and the corresponding diaphragm 218 in the in-plane direction. More specifically, as shown in FIG. 3, the pressure receiving recess 213 and the hollow 226 are formed so as to satisfy WD<WC. WC is a width dimension in the in-plane direction of the pressure receiving recess 213 in the side cross-sectional view. WD is a width dimension in the in-plane direction of the hollow 226 in the side cross-sectional view.

Further, the detection portion 2b is provided with a protection film 230. The protection film 230 is a coating film for suppressing adhesion of deposits to the bottom wall 214 of the pressure receiving recess 213. The term "deposit" as used herein includes not only solid foreign matters but also liquid foreign matters such as grease stains. In the present embodiment, the protection film 230 is formed of an oil-repellent film made of a synthetic resin (for example, a fluorine-based synthetic resin coating film).

Hereinafter, the structure of the protection film 230 will be described in detail with reference to FIG. 3. The protection film 230 is provided on the bottom wall 214 and the side wall 215 so as to cover the bottom wall 214 and the side wall 215 of the pressure receiving recess 213. Specifically, the protection film 230 has a thin film portion 231 and a corner portion 232.

The thin film portion 231 is a portion having a uniform thickness. The thin film portion 231 covers most of the bottom wall 214, that is, at least a portion corresponding to the diaphragm 218. Specifically, the thin film portion 231 is wider than the hollow 226 in the plan view. In other words, the thin film portion 231 is formed to a position outside the outer edge 218a of the diaphragm 218 in the in-plane direction. The corner portion 232 is a portion connected to an outer edge of the thin film portion 231 in the plan view and is formed at a position corresponding to the inner corner area 216. That is, the corner portion 232 is located outside the diaphragm 218 in the in-plane direction. In other words, when viewed in a sightline parallel to the substrate thickness direction, the corner portion 232 is located at a position not overlapping with the diaphragm 218.

Hereinafter, the positional relationship of the corner portion 232 with respect to the diaphragm 218 will be described in more detail with reference to FIG. 3. A film surface 233, which is an outer surface of the protection film 230, that is, a surface exposed toward the detection direction, has a flat surface 234 and a recessed surface 235. The flat surface 234 is provided in a portion corresponding to the thin film portion 231. The recessed surface 235 is provided in a portion corresponding to the corner portion 232.

An intersection point of an extension line LA of the bottom wall 214 of the pressure receiving recess 213 and an extension line LB of the side wall 215 in the side cross-sectional view is defined as a first intersection point P1. A straight line drawn toward the detection space S from the first intersection point P1 is defined as a first straight line L1. The first straight line L1 has an angle of 45 degrees with respect to the bottom wall 214.

An intersection point of the first straight line L1 and the recessed surface 235 is defined as a second intersection point P2. A straight line passing through the second intersection point P2, orthogonal to the first straight line L1, and having an angle of 45 degrees with respect to the bottom wall 214 is defined as a second straight line L2.

An intersection point of the second straight line L2 and the bottom wall 214 is defined as a third intersection point P3. A straight line passing through the outer edge 218a of the diaphragm 218 in the in-plane direction and parallel to the substrate thickness direction is defined as a third straight line L3. An intersection point of the third straight line L3 and the bottom wall 214 is defined as a fourth intersection point P4.

In this case, the detection portion 2b is formed such that a distance between the first intersection point P1 and the third intersection point P3 is less than a distance between the first intersection point P1 and the fourth intersection point P4. That is, the corner portion 232 is located between the extension line LB of the side wall 215 and the third straight line L3 in a side cross-sectional view.

(Effects)

When a protection film is provided on the surface of the recess in the pressure sensor, film formation state may be greatly different between an inner corner area in the recess and the other area. Specifically, when the protection film is made of a synthetic resin film, a corner portion of the protection film may be formed at the inner corner area. Such a difference in the film formation state between the inner corner area in the recess and the other area may affect deflection characteristics of the diaphragm receiving pressure.

As described above, in the present embodiment, the bottom wall 214 and the side wall 215 of the pressure receiving recess 213 are covered with the protection film 230. Thereby, adhesion of deposits to the bottom wall 214 and the side wall 215 are suppressed.

In many cases, the protection film 230 is formed by applying a synthetic resin paste to the bottom wall 214 and the side wall 215 of the pressure receiving recess 213 and drying the coated film. Therefore, in the protection film 230, the corner portion 232 is formed at the position corresponding to the inner corner area 216 in the pressure receiving recess 213. In the present disclosure, the corner portion 232 is located outside the diaphragm 218 in the in-plane direction. Therefore, influences of the corner portion 232 on the deflection characteristics of the diaphragm 218 are suppressed as much as possible. Therefore, according to the present embodiment, adhesion of deposits on the surface of the pressure receiving recess 213 for forming the diaphragm 218, that is, the bottom wall 214 and the side wall 215 are satisfactorily suppressed.

(Modifications)

The present disclosure is not limited to the embodiment described above and may be appropriately modified. Representative modifications will be described below. In the following description of modifications, only parts different from the above-described embodiment will be described. Therefore, in the description of the following modifications, regarding components having the same reference numerals as the components of the above-described embodiment, the description in the above-described embodiment may be appropriately cited unless there is a technical inconsistency.

The present disclosure is not limited to the specific device configuration shown in the above embodiment. For example, the pressure sensor 1 is not limited to the engine oil pressure sensor. That is, for example, the pressure sensor 1 may be an in-vehicle oil pressure sensor such as a brake oil pressure sensor, a transmission oil pressure sensor, a suspension oil pressure sensor, a fuel pressure sensor, or the like. Alternatively, the pressure sensor 1 may be an in-vehicle gas pressure sensor such as an intake pressure sensor, an exhaust pressure sensor, or the like. Further, the pressure sensor 1 is not limited to an in-vehicle sensor. That is, for example, the pressure sensor 1 may be a fluid pressure sensor attached to an oil pressure path, a hydraulic path or a gas pressure path in a plant facility.

Depending on the application of the pressure sensor 1, that is, the kind of fluid whose pressure to be detected, the material and properties of the protection film 230 may be appropriately changed. Therefore, for example, the protection film 230 may be a water-repellent film.

The first substrate 21 and the second substrate 22 may be formed of the same material or different materials. The second substrate 22 may be formed of a material other than a semiconductor.

The substrate 20 is not limited to a structure in which the first substrate 21 and the second substrate 22 are stacked and joined in the substrate thickness direction. That is, the substrate 20 may be integrally and seamlessly formed in the substrate thickness direction.

The planar shapes of the pressure receiving recess 213 and the hollow 226 are not limited to the regular octagonal shape as in the above embodiment. That is, for example, the planar shapes of the pressure receiving recess 213 and the hollow 226 may be a circular shape, a rectangular shape including a square, or a polygonal shape having five angles or more.

Figure 4:
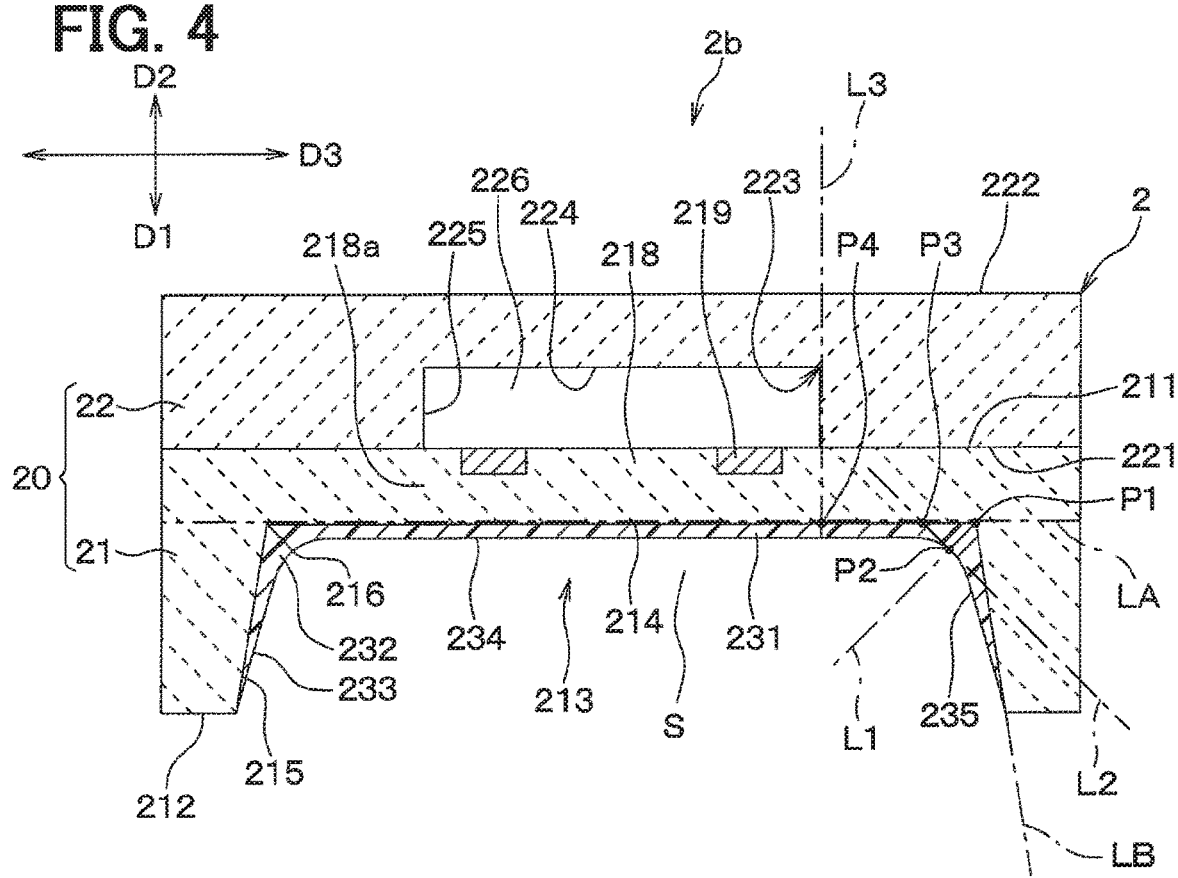
FIG. 4 is a side cross-sectional view showing a modification of a configuration of the detection portion shown in FIG. 3.

As shown in FIG. 4, the side wall 215 may have a tapered shape that widens toward the detection direction. Alternatively, as shown in FIG. 5, the side wall 215 may have a reverse tapered shape that narrows toward the detection direction.

Figure 6:
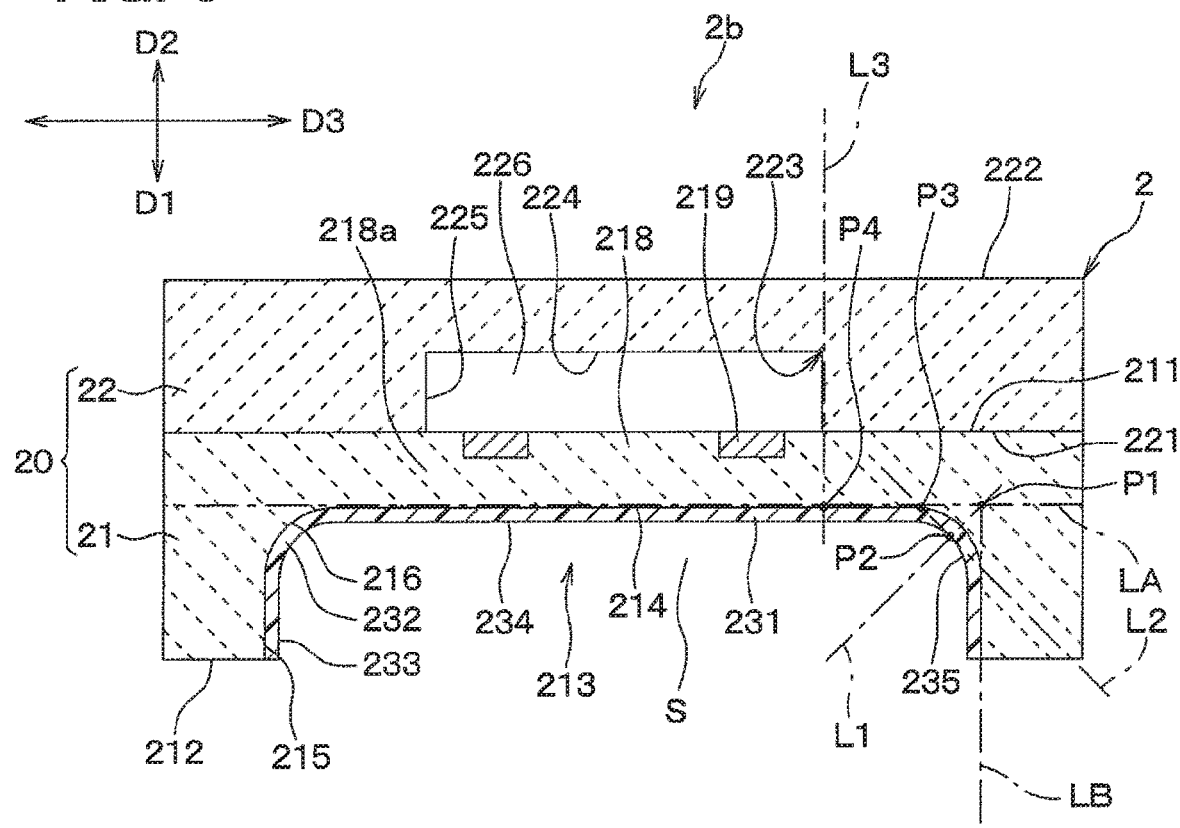
FIG. 6 is a side cross-sectional view showing further other modification of the configuration of the detection portion shown in FIG. 3.

The surface of the inner corner area 216 may have a concave shape. In this case, as shown in FIG. 6, the first intersection point P1 is located inside the first substrate 21.

Figure 5:
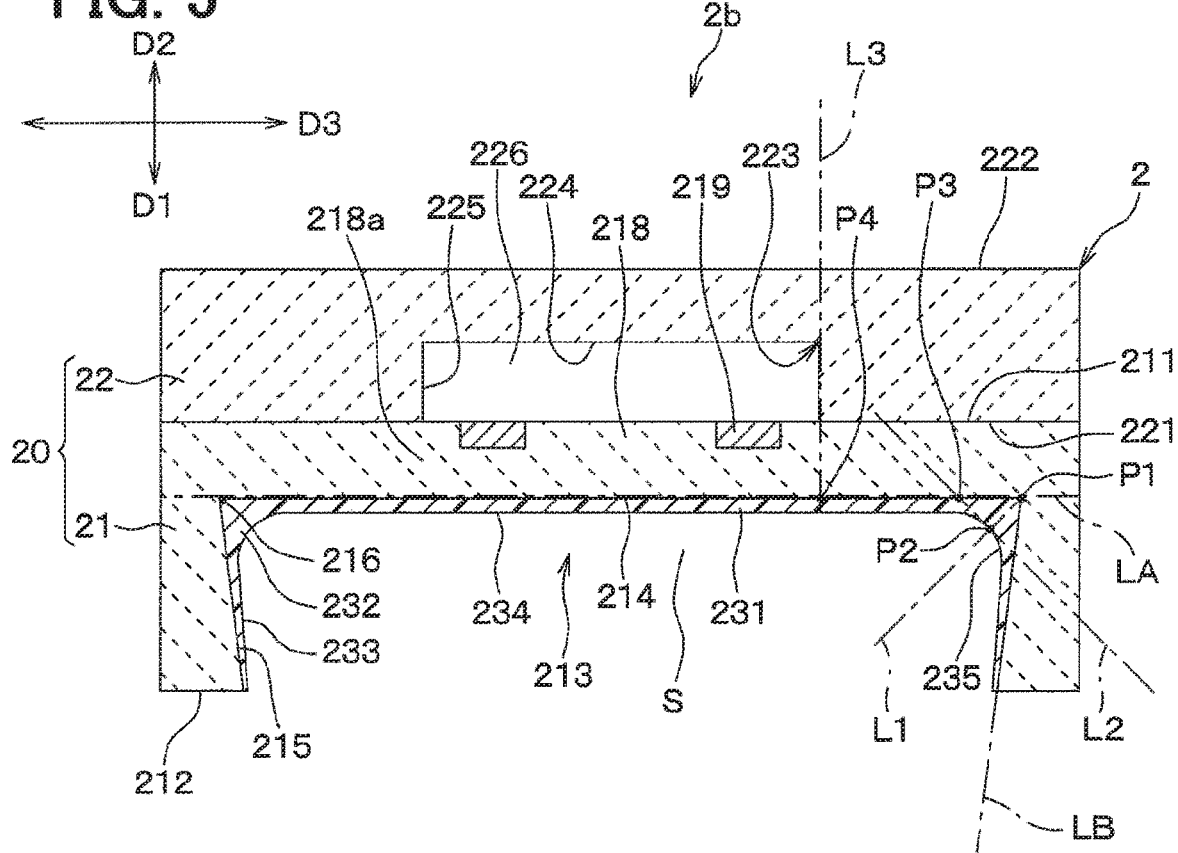
FIG. 5 is a side cross-sectional view showing another modification of the configuration of the detection portion shown in FIG. 3.

This is the same even if the side wall 215 has the tapered shape (see FIG. 4) or the reverse tapered shape (see FIG. 5).

The inside of the hollow 226 may be a vacuum or may be filled with a gas or a liquid.

Figure 7:
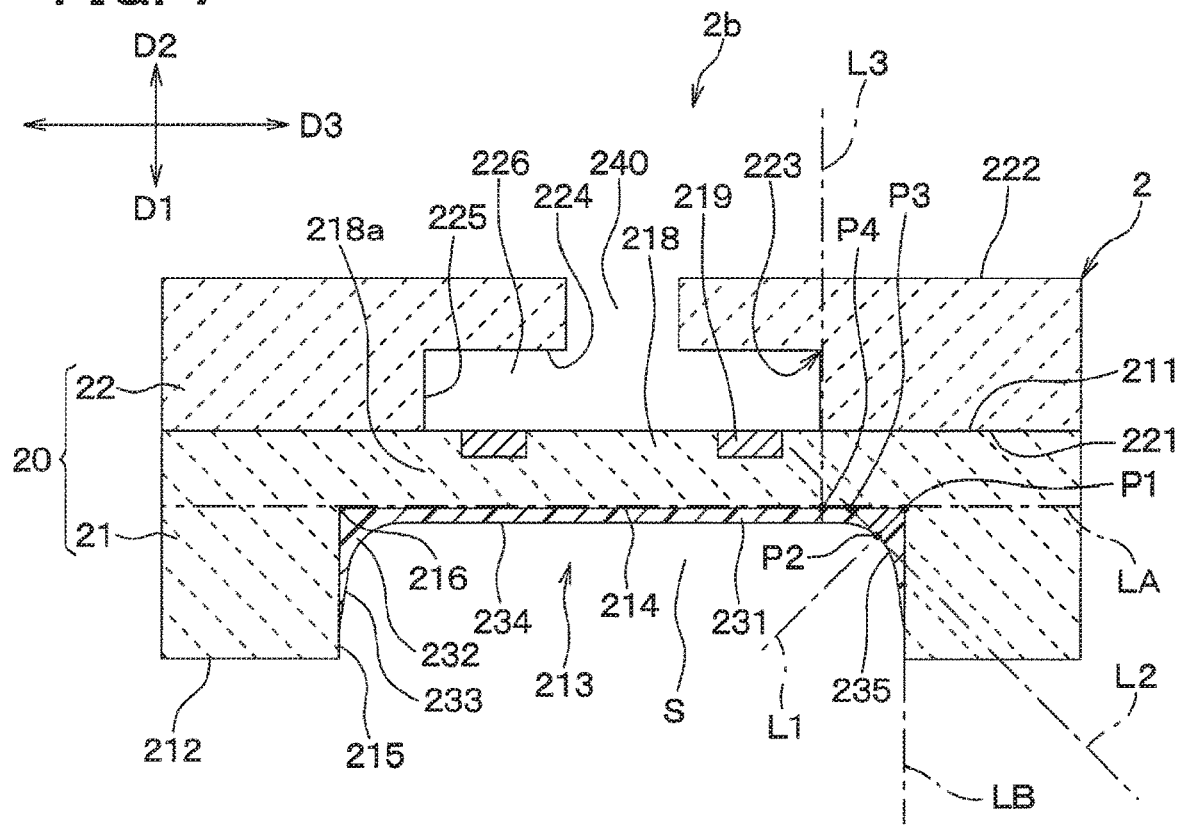
FIG. 7 is a side cross-sectional view showing further other modification of the configuration of the detection portion shown in FIG. 3.

The hollow 226 may communicate with the outside of the substrate 20. For example, the rear recess 223 may be formed by a through hole that penetrates the second substrate 22 in its thickness direction. Alternatively, for example, as shown in FIG. 7, the second substrate 22 may have a through hole 240 communicating with the hollow 226. The through hole 240 has one end in the substrate thickness direction opened at the outer main surface 222 and the other end opened at the hollow 226.

The modifications are not limited to the above-described examples. A plurality of modifications may be combined with each other. Furthermore, all or a part of the above-described embodiment and all or a part of the modifications may be combined with each other.

Optional aspects of the present disclosure will be set forth in the following clauses.

According to an aspect of the present disclosure, a pressure sensor includes a diaphragm having a thin plate shape. The diaphragm is provided in a part of a substrate in a thickness direction. The diaphragm is provided in a part of the substrate in an in-plane direction. The in-plane direction is orthogonal to the thickness direction. The diaphragm is flexibly deformable in the thickness direction. The pressure sensor is configured to generate an electrical output according to a fluid pressure in a detection space applied to the diaphragm. The detection space and the diaphragm are adjacent to each other in the thickness direction.

The pressure sensor includes a pressure receiving recess and a protection film. The pressure receiving recess is provided in the substrate to define the detection space by opening toward a detection direction along the thickness direction. The pressure receiving recess includes a bottom wall and a side wall. The bottom wall is parallel to the in-plane direction and has an outer edge portion outside the diaphragm in the in-plane direction. The side wall protrudes from the outer edge portion of the bottom wall in the detection direction. The protection film covers the bottom wall and the side wall. Specifically, the protection film has a corner portion provided in an inner corner area of the pressure receiving recess where the bottom wall and the side wall connect with each other. The corner portion is located outside the diaphragm in the in-plane direction.

According to the aspect of the present disclosure, the bottom wall and the side wall of the pressure receiving recess are covered with the protection film. Thereby, adhesion of deposits to the bottom wall and the side wall are suppressed. The corner portion of the protection film is provided in the inner corner area of the pressure receiving recess. According to the aspect of the present disclosure, the corner portion is located outside the diaphragm in the in-plane direction. Therefore, influences of the corner portion on the deflection characteristics of the diaphragm are suppressed as much as possible. According to the aspect of the present disclosure, adhesion of deposits on the surface of the pressure receiving recess for forming the diaphragm, that is, the bottom wall and the side wall are satisfactorily suppressed.

What is claimed is:

1. A pressure sensor configured to generate an electrical output according to a fluid pressure in a detection space applied to a diaphragm, the diaphragm being provided in a part of a substrate in a thickness direction and an in-plane direction orthogonal to the thickness direction, the diaphragm being a thin plate flexibly deformable in the thickness direction, the diaphragm and the detection space being adjacent to each other in the thickness direction, the pressure sensor comprising:
    a pressure receiving recess that is provided in the substrate to define the detection space by opening toward a detection direction along the thickness direction, the pressure receiving recess including a bottom wall and a side wall, the bottom wall being parallel to the in-plane direction and having an outer edge portion outside the diaphragm in the in-plane direction, the side wall protruding from the outer edge portion of the bottom wall in the detection direction; and
    a protection film that covers the bottom wall and the side wall,
    wherein:
    the substrate includes a first substrate portion extending from the diaphragm in a detection direction, and a second substrate portion extending from the diaphragm in a pressure receiving direction opposite to the detection direction,
    the protection film has
        a corner portion provided in an inner corner area of the pressure receiving recess where the bottom wall and the side wall connect with each other, and
        a thin film portion having a uniform thickness and covering a portion of the bottom wall corresponding to the diaphragm, and
    a thickness of the thin film portion is smaller than a depth of the pressure receiving recess; and
    the corner portion is located outside the diaphragm in the in-plane direction.

2. The pressure sensor according to claim 1, wherein the corner portion is located at a position of the pressure receiving recess not overlapping the diaphragm when viewed in a sightline parallel to the thickness direction.

3. The pressure sensor according to claim 1, wherein
    a first intersection point is defined by an intersection point of an extension line of the bottom wall and an extension line of the side wall in a cross-section taken along a plane parallel to the thickness direction,
    a second intersection point is defined by an intersection point of a surface of the corner portion facing the detection space and a first straight line extending from the first intersection point toward the detection space and having an angle of 45 degrees with respect to the bottom wall,
    a third intersection point is defined by an intersection point of the bottom wall and a second straight line passing through the second intersection point, orthogonal to the first straight line, and having an angle of 45 degrees with respect to the bottom wall,
    a fourth intersection point is defined by an intersection point of the bottom wall and a third straight line passing through an outer edge of the diaphragm in the in-plane direction and parallel to the thickness direction, and
    a distance between the first intersection point and the third intersection point is less than a distance between the first intersection point and the fourth intersection point.

4. The pressure sensor according to claim 1, further comprising
    a hollow provided in the second substrate portion and located away from the diaphragm in the pressure receiving direction, wherein
    the outer edge portion of the bottom wall is located outside the hollow in the in-plane direction.

5. The pressure sensor according to claim 4, wherein
the substrate includes a first substrate and a second substrate joined with each other,
the first substrate includes the first substrate portion and has the pressure receiving recess and the diaphragm, and
the second substrate includes the second substrate portion and has a rear recess that defines the hollow by opening toward the detection direction.

6. The pressure sensor according to claim 4, wherein
the diaphragm is located between the hollow and the pressure receiving recess.

7. The pressure sensor according to claim 1, wherein
the protection film includes a synthetic resin film.

8. The pressure sensor according to claim 1, wherein:
the protection film has a surface exposed toward the detection direction; and
the surface has
- a flat surface at a portion of the surface corresponding to the thin film portion, and
- a recessed surface at a portion of the surface corresponding to the corner portion.

* * * * *